US009646437B2

(12) United States Patent
Gutierrez

(10) Patent No.: US 9,646,437 B2
(45) Date of Patent: May 9, 2017

(54) METHOD OF GENERATING A TEMPORARILY LIMITED AND/OR USAGE LIMITED MEANS AND/OR STATUS, METHOD OF OBTAINING A TEMPORARILY LIMITED AND/OR USAGE LIMITED MEANS AND/OR STATUS, CORRESPONDING SYSTEM AND COMPUTER READABLE MEDIUM

(75) Inventor: Emilio Martinez Gutierrez, Madrid (ES)

(73) Assignee: AGNITIO, SL, Madrid (ES)

( * ) Notice: Subject to any disclaimer, the term of this patent is extended or adjusted under 35 U.S.C. 154(b) by 60 days.

(21) Appl. No.: 12/736,436

(22) PCT Filed: Apr. 8, 2008

(86) PCT No.: PCT/EP2008/002777
§ 371 (c)(1),
(2), (4) Date: Oct. 6, 2010

(87) PCT Pub. No.: WO2009/124562
PCT Pub. Date: Oct. 15, 2009

(65) Prior Publication Data
US 2011/0044433 A1 Feb. 24, 2011

(51) Int. Cl.
*H04M 1/64* (2006.01)
*G07C 9/00* (2006.01)

(52) U.S. Cl.
CPC ..... *G07C 9/00158* (2013.01); *G07C 9/00563* (2013.01)

(58) Field of Classification Search
USPC ................ 379/88.01, 88.02, 142.05, 406.03; 455/411
See application file for complete search history.

(56) References Cited

U.S. PATENT DOCUMENTS 5,274,695 A * 12/1993 Green ........................ 379/88.02
5,303,299 A 4/1994 Hunt
5,365,574 A 11/1994 Hunt
5,923,756 A * 7/1999 Shambroom ................ 713/156
6,292,728 B1 9/2001 Masegi
(Continued)

OTHER PUBLICATIONS

U.S. Appl. No. 10/236,963, filed Sep. 9, 2002, Daniel Jourdain.
(Continued)

*Primary Examiner* — Yosef K Laekemariam
(74) *Attorney, Agent, or Firm* — Galvin Patent Law LLC; Brian R. Galvin

(57) ABSTRACT

The invention refers to a method of generating a means and/or status which is temporarily limited and/or usage limited and allows access to a service which has access restrictions, the method being carried out in a computing system and comprising the steps of establishing a telecommunications connection such that an audio call as for example a telephone call, within the telecommunications connection is preferably initiated by a person; determining biometric data of a specific person such as for example voice information; receiving data such as a voice utterance from the person which is connected by the telecommunications connection; verifying that the received data and the determined biometric data fit; and generating the means and/or status which is temporarily limited and/or usage limited after the verifying step.

11 Claims, 4 Drawing Sheets

(56) References Cited

U.S. PATENT DOCUMENTS

Figure 1:
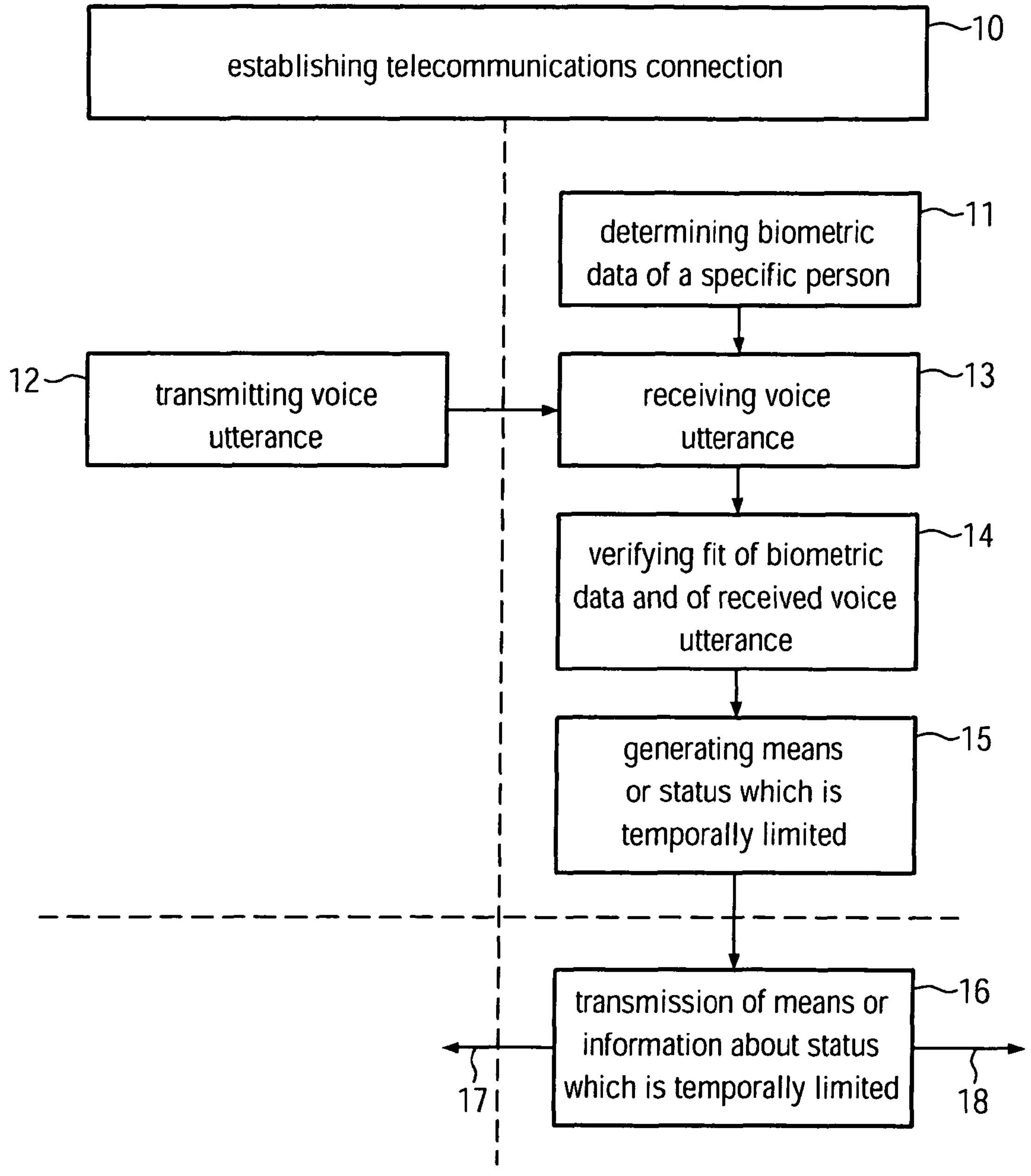

| | | | | |
|---|---|---|---|---|
| 7,058,814 | B1 * | 6/2006 | Zimmerman | 713/178 |
| 7,100,195 | B1 * | 8/2006 | Underwood | 726/2 |
| 7,164,754 | B2 * | 1/2007 | Trinkel | H04M 3/38 340/5.52 |
| 2003/0112941 | A1 * | 6/2003 | Brown | H04M 3/2218 379/196 |
| 2003/0135740 | A1 * | 7/2003 | Talmor | G06F 21/32 713/186 |
| 2003/0233327 | A1 * | 12/2003 | Keresman et al. | 705/44 |
| 2004/0070566 | A1 * | 4/2004 | Ashton | G06F 3/03543 345/156 |

OTHER PUBLICATIONS

U.S. Appl. No. 10/950,796, filed Sep. 27, 2004, John Wankmueller.
U.S. Appl. No. 11/217,074, filed Aug. 30, 2005, Brian Spector.
U.S. Appl. No. 11/420,190, filed May 24, 2006, Germano Di Mambro.

* cited by examiner

METHOD OF GENERATING A TEMPORARILY LIMITED AND/OR USAGE LIMITED MEANS AND/OR STATUS, METHOD OF OBTAINING A TEMPORARILY LIMITED AND/OR USAGE LIMITED MEANS AND/OR STATUS, CORRESPONDING SYSTEM AND COMPUTER READABLE MEDIUM

The present invention refers to a method for generating a means and/or status which is temporarily limited and/or limited in allowed usage, to a method for obtaining a temporarily limited means and/or status and/or means and/or status limited in allowed usage, to a system for generating a means and/or status which is temporarily limited and/or limited in allowed usage and to a computer-readable medium.

Many services exist which have access restrictions in order to avoid fraud. Examples thereof may be cash machines or online services for buying or selling products or services or for performing financial transactions via a telecommunications system such as the internet.

Further, it is known to have e.g. numerical keys such as personal identification numbers (PIN) in order to access such services.

Since it is relatively easy to steal or copy such PINs or passwords, fraud occurs frequently.

In some cases it is known to use passwords which are to be provided by telephone to an operator in order to access for example a telephone banking service. Here anyone who listens to such a telephone call may obtain the password and use it for fraud.

Further, it is known to use the voice of a person as an access key to services which have access restrictions. This however imposes a difficulty in that only a particular person may access the service which often results in inconvenience since no other person can be authorized to access the service.

The present invention has the object of increasing security of access for services which have access restrictions.

Preferred embodiments are disclosed in the dependent claims.

According to the method, a means and/or a status which is temporarily limited is generated after having verified the identify of the person who is desiring such temporarily limited means and/or status from its biometric data such as biometric voice data. Since the voice of a person or other biometric data can hardly be falsified and the voice or other biometric data is used for creating a temporarily limited means and/or status, fraud becomes practically impossible. Biometric voice data are for example dependent on the size and shape of the throat or mouth of a person.

Biometric voice data may be data extracted from a frequency analysis of a voice. From a voice recording voice sequences of e.g. 20 or 30 ms may be Fourier-transformed and from the envelope thereof biometric voice data can be extracted. From a multiple of such Fourier-transformed voice sequences a statistical voice model can be generated, named Gaussian mixed model (GMM). However, any other biometric voice data that allow distinguishing one voice from another voice due to voice characteristics may be used.

The temporarily or usage limited means may be e.g. an key such as a sequence of letters or numbers (alphanumeric key). It may be a password or a PIN. Such a key is temporarily limited in the sense it can be used only for a predefined time since the service or device accepting such an key may accept the key in order to overcome the access restrictions only for a predefined time. The predefined time and/or usage limitation may be encoded in the key (or otherwise be connected to or attached to the key) e.g. by including a time period indication during or a time limit indication up to which it may be accepted and/or any other indication of usage limitation.

The temporarily limited or usage limited status may be a status of a communications service, such as a web server in the internet which allows access to particular services in this status, while access is not possible otherwise. This status may be, for example, a bank account service, a financial transaction service or any other service with access restrictions. The status may also be configured to accept the temporarily limited means as a key only during such a time. In this case both a temporarily limited means (e.g. key) and a temporarily limited status (possibility to use/enter key) is generated. During the temporarily limited status it may also be possible to enter a conventional key which is not limited in time in order to access the service, while such entering of a key is not possible by a status different from the temporarily limited status.

The means and/or status, which is temporarily limited or usage limited allows the access to the service which is related to the person whose biometric data have been determined. If for example the biometric data of a particular person are determined, then the service related to this person becomes accessible by the generated means and/or status but not to that of other persons. For example the access to the bank account of that person becomes possible, but not to the bank accounts of other persons.

A means and/or status which is limited in allowed usage (usage limited means and/or status) imposes certain constraints on the use of the service which is to be accessed with or due to the means and/or status. This constraint may be for example a limited amount of times the service may be accessed. The constraint may be for example that the service can be accessed only once, twice, three or four times. Further constraints may refer to the functionality of the accessed service. For example in online or telephone banking limits in the amount of money which can be manipulated may be imposed by the means and/or status. Further if the service provides different functions (e.g. money transfers, cash withdrawal and bank account information) the means and/or status may be limited such that only parts of the possible functions are usable and the other functions are disabled. A further possible limitation in usage refers to a particular access to the service. For example a cash dispensing service can be limited to only one, two, three or a group of particular cash dispensing machines from all possible cash dispensing machines. Only from a selected group of cash dispensing machines the service is allowed. The selected group is a group with less cash dispensers than all the selectable cash dispensers.

The means and/or information about the status which is temporarily limited and/or limited in usage is preferably communicated to a device for rendering it visible or audible. Thereby it is possible to inform that person of the temporarily limited and/or usage means and/or status. This can be done, for example, by communicating an key (e.g. alphanumeric) by telephone communication, by email, an SMS or Internet connection or by instant messaging or the like.

A telecommunications connection may be an audio call which is established by a landline connection, a mobile telephone connection or internet connection.

The telecommunications connection may be established by a person who desires to obtain a certain means and/or status which is temporarily limited and/or usage limited and allows access to a service which has access restrictions. A telecommunications connection however, may also be established by the computing system. This increases security in the sense that the telecommunications connection is established by a predefined telecommunications connection such that fraud is made more difficult since a telephone call to a predefined telephone number, for example, cannot be intercepted or redirected easily.

In the case that the telecommunications connection is established by the computing system then this is preferably done after having received a request for establishing such a telecommunications connection by a person.

Determining a biometric data of a specific person can be, for example, determining a voice information. This may be a stored voice sample or may be a model that describes a voice such as a statistical model. For example, a Gaussian mixed model (GMM) may be used in order to describe parameters characteristic for a particular voice of a particular person.

From a telecommunications connection, typically metadata may be obtained. For example when a telephone call is a landline connection or a mobile telephone connection, it is possible to transmit the telephone number of the caller to the receiver, however not by voice but by the mentioned meta data. The metadata refers to data about the connection and not to data transmitted by the voice transmission. Equally, by a communication over the internet, the IP address of the sender is known to the receiver due to the used protocol. Such information can be used to identify a particular person by obtaining the telephone number of a calling device or an IP address. This information may then be used to determine the biometric data of a specific person.

On the other hand, an established telecommunications connection may be used to receive information from which the identification of a person can be obtained. For example, the user may express or spell his name or identification or a number which identifies him. This data is then transmitted by the telecommunications connection and received at the computing system and evaluated accordingly. Such information may then be used to determine the biometric data.

The generated means may be advantageously transmitted to a service device, such as, for example, a cash dispenser or verification system, verifying an access key entry. This transmission is done in order for the service device of the verification system to be able to verify any entered access key in order to provide the access to the desired service.

In the verifying step the received data can be processed in order to extract data which can be compared to the biometric data or which can be analyzed with help of the biometric data.

In a preferred embodiment, an indication of the desired temporary limitation of the means and/or status is received. The means and/or status which is temporarily limited is generated according to this desired temporary limitation. This is particularly advantageous in order to provide flexibility to a user with respect to the time by which the means and/or status is to be useful and in case a maximum time limit may be indicated which is between 5 minutes and 20 days. In the case that a desired temporary limitation is above a given maximum limitation in time, the means and/or status is generated with this maximum predefined time instead of the desired temporary limitation. The latter in any case is used in case that the desired temporary limitation is less than the predefined temporary limitation.

In a preferred embodiment the method of generating a temporarily limited means and/or status is combined with prior art methods of preventing fraud such as additional use of conventional PINs or passwords which need to be typed in or need to be spoken, cards with digital information thereon, etc.

In case of the generation of a usage limited means and/or status the desired usage limitation may be indicated/received equally.

Further the generated means and/or status may further be a combination of a means and/or status which is temporarily limited and usage limited.

In a method of obtaining a temporarily limited and/or usage limited status and/or means, the following steps are carried out with a user terminal. The user terminal may be, e.g. a telephone, a mobile telephone, a device which may be connected to the internet, a personal computer, a portable computer, a PDA (Personal Digital Assistant) or the like.

In the method a telecommunications connection is established between the user terminal and a computing system. The telecommunications connection may be initiated by a person who desires to obtain a temporarily limited and/or usage limited means and/or status or may be initiated by the computing system as explained above.

Further in the method, a voice utterance is transmitted with the user terminal to the server. Further information about a temporarily limited and/or usage limited means and/or status is received while this temporarily limited and/or usage limited means and/or status allows access to a service with access restrictions.

The received information is preferably rendered visible or audible. With the user terminal however, it may also be forwarded to another device which renders it visible or audible.

The system comprises different components which are a telecommunication component, a determining component, a data receiving component, a verifying component and a means and/or status generating component.

Figure 2:
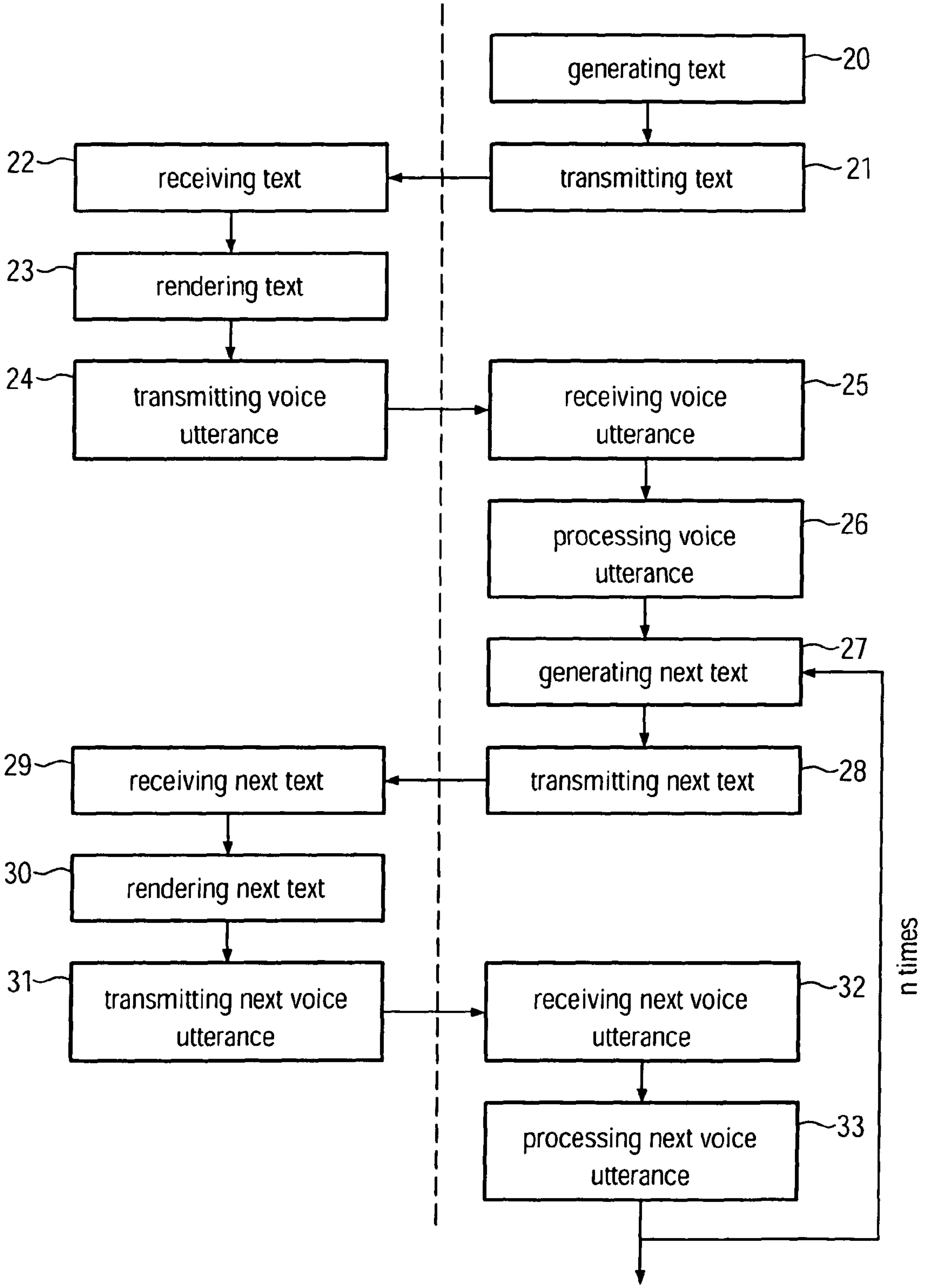
Figure 3:
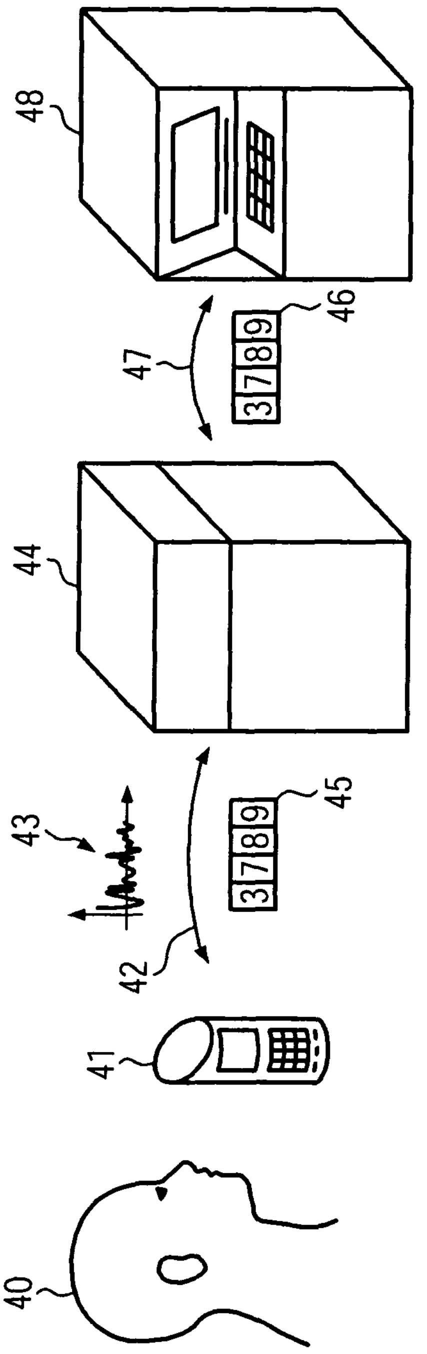

Preferred embodiments of the invention are disclosed in the following Figures. These Figures are provided in order to show a preferred embodiment of the invention but are not to be understood as limiting the invention. It is shown in:

FIG. 1 method steps of an embodiment of the invention;

FIG. 2 method steps of a preferred example;

FIG. 3 different components used in an embodiment of a method; and

Figure 4:
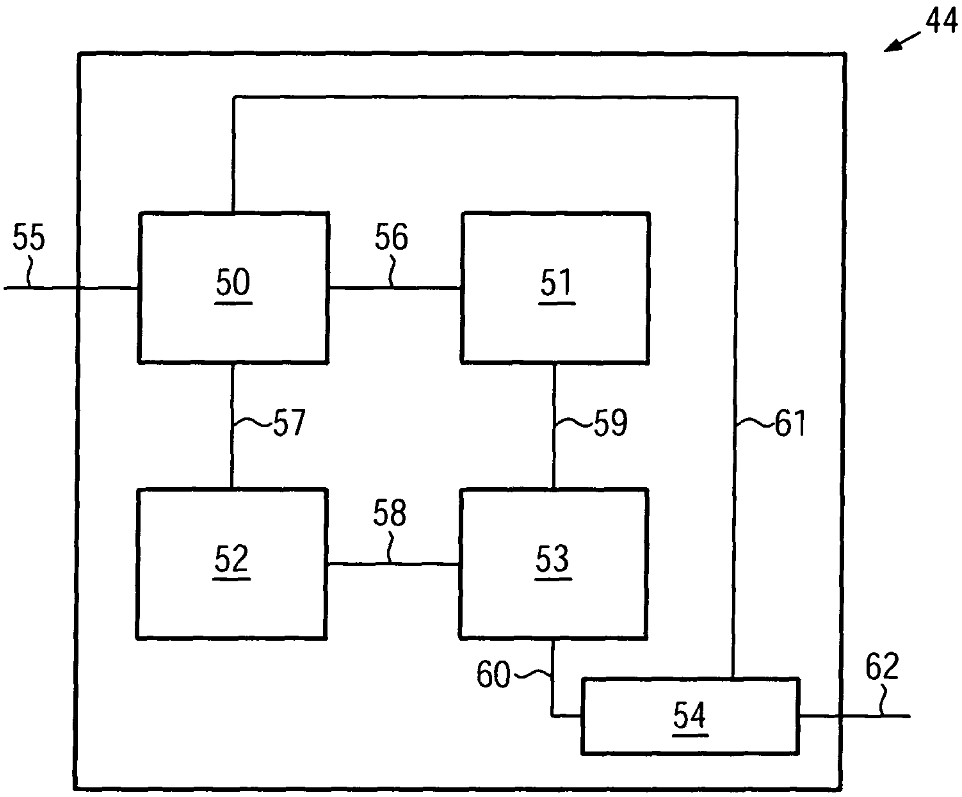

FIG. 4 schematic indication of components of an embodiment of a system.

In FIG. 1, a telecommunications connection is established between a user terminal and a computing system in step 10. The user terminal is supposed to be represented on the left side of the dash line and the computing system on the right side of the dash line. The computing system may be one single computer or a group of computers connected with each other.

The telecommunications connection may be initiated by the user terminal or a computing system on request of a person. If requested by a person by a particular communications system it is preferred to use this same communications system to establish the telecommunications connection. In other embodiments predefined communications systems or connections or communications systems selected in the request by the person may be used. For example it may be predefined, that the telecommunications connection is only established to a particular land line connection and/or a particular mobile connection. Further the person may request for example in an internet web page one of a plurality of predefined communications system or indicate a particular desired connection, for example to a particular number. For security reasons the use of predefined connections is preferred.

In the computing system, biometric data of a specific person are determined in step 11. In this particular embodiment, the biometric data are supposed to be biometric data concerning the voice of a specific person but in general, any other biometric data may be considered useful as, for example, fingerprints and/or images of the eye or data extracted there from. These other biometric data preferably are available in a digital format such that they can be transmitted digitally.

The user terminal transmits in a specific example a voice utterance (other biometric information may be transmitted instead or additionally). This voice utterance is received in step 13. The voice utterance can have any not predetermined content. Indeed the person can provide any text since only the voice characteristics need to be determined, which are independent of a particular text. This provides the advantage that no personal secret such as a PIN or a password or any other key needs to be pronounced loudly, which could be used for fraud by listening to the utterance.

The determination in step 11 and the reception in step 13 can also be performed in parallel at the same time or the determination is done after reception of the voice utterance. In this case any semantic information provided in the voice utterance can be used to determine the biometric data such as a name, an identification number or the like.

In step 14, the determined biometric data and the voice utterance are used in order to verify whether the voice utterance fits with the determined biometric data.

In case that the verification results positively, namely, that the biometric data and the received voice utterance fit together, then the means and/or status which is temporarily limited and/or usage limited is generated.

In the bottom of FIG. 1, an optional step 16 is shown. In this optional step, the means, or information about the status which is temporarily limited and/or usage limited, are transmitted. This may be done by means 17 to the user terminal or any other way in order to communicate with the person who transmitted the voice utterance and furthermore, the means and/or information may be transmitted by channel 18 to a service or system which is desired to be accessed.

FIG. 2 shows another portion of a method which may be carried out instead of steps 12 and 13 of FIG. 1.

In step 20, a text is generated by the computing system. In step 21, this text is transmitted to the user terminal which is received there in step 22. In step 23, the text is rendered making it readable or audible. In step 24, a voice utterance is transmitted which is received in the computing system in step 25. In step 26, the received voice utterance is processed.

With these steps the expected semantic content of the voice utterance is known in advance and can be taken into account in the processing of the voice utterance. Thereby it is possible to use improved methods for voice recognition, for example using a Hidden Markow Model which takes into account transition probabilities between the different Gaussian Mixed Models each of which refers to a sound or letter within a word. Since furthermore the text is generated dynamically i.e. during the method of generation, it is assured that the received voice utterance is not a previously recorded one, which is used for fraud. The generated text is preferably a random text which is composed of randomly selected text components which may be letters, numbers or words or combinations thereof. The text components are preferably selected from a predefined set of text components such as for example the single digits from 0 to 9, and/or the single letters from a to z.

In case that the text is rendered audible only it is preferable that not more than three, four or five text portions are provided in one rendering step since with more text portions it turns out to lead to difficulties since more than three, four or five text portions may not be memorized. In this case it is preferable to have more than one, two three or four texts transmitted to the user for rendering such that more voice utterances are available for processing.

In case that the text is rendered readable it is preferred that more than four, six, eight, ten or twelve text portions are provided in the text. The longer the voice utterance the more secure is the verification.

The following steps in FIG. 2 are optional. In steps 27 and 28, the next text is generated, transmitted and received by the user terminal in step 29. In step 30 this next text is rendered and the next voice utterance is transmitted in step 31 which is received in the computing system in step 32. Then in step 33, this next voice utterance is processed. The steps of steps 27 to 33 may be repeated one, two, three, four, five, six or more times.

By carrying out the steps 27 to 33, one or more times, at least two or more voice utterances are received which can be processed. This allows verification of the fit in step 14 of FIG. 1 more accurately.

The processing step 26 in FIG. 2 is optional and the processing may also be carried out after having received the next voice utterance in step 32. The received voice utterance of step 25 and step 32 may be processed together in one step 33.

While in FIG. 2, the text is generated and transmitted by the computing system it is also thinkable that a certain text is generated by the user terminal and then the voice utterance is transmitted and the generated text is transmitted to the computing system.

It is however preferred that the text is generated dynamically on the computing system side in order to ensure that the voice utterance is generated in the particular moment in order to avoid fraud by having the voice recorded.

Once the identify of the specific person is verified, the established telecommunication can be used to exchange further information. For example, further services which require verification of an identify can be conducted or offered afterwards. This may, e.g. be any online or telephone banking activity.

In FIG. 3, different devices used during the method are shown. A person 40 has a user terminal 41 which may be a mobile telephone or a landline telephone which preferably has a display, a PDA, a computer or the like. Device 41 needs at least a microphone which is capable of recording a voice utterance. In a preferred embodiment the device has a display capable of displaying text received by the device 41.

A voice utterance 43 may be transmitted to computing system 44 by a telecommunications connection 42.

A 4-digit PIN ("3789") with reference sign 45 can be transmitted to the user terminal 41. Further, a copy of the 4-digit PIN 46 may be communicated by another telecommunications connection to a device 48 such as e.g. a cash dispenser 48.

On the other hand, the device 48 may also transmit an entered key 46 to the computing system 44 which verifies the key and transmits corresponding information to the device 48 allowing access to the service of device 48.

In FIG. 4, a schematic computing system 44 is shown. The system has a telecommunications component 50 which may receive or establish a telecommunications connection by line 55. Data about this telecommunications connection may be passed by connection 56 to a determining component 51 which determines corresponding biometric data of a specific person. Here, a database may be consulted by the determining component 51.

Further, with the telecommunications component 50 or another telecommunications component (not shown), a voice utterance or any other data suitable for identifying a person can be received by the data receiving component 52. A verifying component 53 verifies that the received data passed by connection 58 and the determined biometric data passed by connection 59 fit.

In case that the verification results positively, a means and/or status generating component 54 generates the desired temporarily limited and/or usage limited means and/or status. The means and/or the status may be communicated by the telecommunications component 50 or any other telecommunications component to a user terminal with help of connection 61. The generated means and/or information about the generated status may also be communicated by line 62 to other devices such as a cash dispenser, a web server or the like.

The invention claimed is:

1. A computer-implemented method of providing a means or a status, or both, that is usage limited and that allows access to a system that has access restrictions, comprising the steps of:

(a) establishing a landline or mobile telephone call, wherein the telecommunications connection is preferably initiated by a person and at least a portion of the telecommunications connection is a telephone call on a public switched telephone network;

(b) determining voice biometric data of a specific person;

(c) receiving data comprising a voice utterance from the person who is connected by the telecommunications connection;

(d) verifying that the received data and the determined voice biometric data fit;

(e) generating a temporary key based at least in part on the received data and the results of the verification step;

(f) encoding the key with a quantity of use, wherein the quantity of use is greater than one;

(g) transmitting the key to the person;

(h) transmitting the key to a resource that is remote to the specific person; and (i) generating a means or a status or both, which limits access by the person to the resource to a specific number of uses of the resource, wherein the specific number of uses is greater than one.

2. The method of claim 1, wherein the means comprises a key that is for example a sequence of letters and/or numbers.

3. The method of claim 1, wherein the status comprises the status of a communications server, such as a web server, which in this status allows access to a particular web service such as for example a bank account web service.

4. The method of claim 1, wherein the means and/or information about the status, which is temporarily limited or usage limited, is transmitted or communicated to a device for rendering it visible or hearable.

5. The method of claim 1, wherein the audio call is established by a landline connection, a mobile telephony connection or internet connection.

6. The method of claim 1, wherein from data concerning the telecommunications connection an identification of a person is obtained such as a telephone number of a calling device and/or an IP address.

7. The method of claim 1, wherein by means of the telecommunications connection information is received from which the identification of a person is obtained such as by receiving information of a name, an identification or a number.

8. The method of claim 6, wherein based on the obtained identification the biometric data are determined.

9. The method of claim 1, wherein in the verifying step the received data is processed in order to extract data which can be compared to the biometric data or which can be analyzed with help of the biometric data.

10. The method of claim 1, wherein an indication of a usage limitation of the means and/or status is received and the means and/or status which is usage limited is generated according to this desired usage limitation.

11. A system for generating a means and/or status that is usage limited-and that allows access to a system that has access restrictions, comprising the components:

a telecommunications component for establishing a landline or mobile telephone call, wherein the telecommunications connection is preferably initiated by a person and at least a portion of the telecommunications connection is a telephone call on a public switched telephone network;

a determining component for determining voice biometric data of a specific person;

a data receiving component for receiving data comprising a voice utterance from the person who is connected by the telecommunications connection;

a verifying component for verifying that the received data and the determined voice biometric data fit; and a means and/or status generating component which limits access to a resource that is remote to the specific person to a specific quantity of use after the verifying step, wherein the quantity of use is greater than one;

wherein the generating component generates a temporary key encoded with a specific number of allowed uses of the resource based at least in part on the received data, wherein the specific number of allowed uses is greater than one; and wherein the generating component transmits the key to the person and to the resource.

* * * * *